(12) United States Patent
Sung (10) Patent No.: US 11,302,243 B2
(45) Date of Patent: Apr. 12, 2022

(54) IMAGE DISPLAY SYSTEM AND IMAGE DATA TRANSMISSION APPARATUS AND METHOD THEREOF HAVING SYNCHRONOUS DATA TRANSMISSION MECHANISM

(71) Applicant: REALTEK SEMICONDUCTOR CORPORATION, Hsinchu (TW)

(72) Inventor: Lien-Hsiang Sung, Hsinchu (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 102 days.

(21) Appl. No.: 17/001,712

(22) Filed: Aug. 25, 2020

(65) Prior Publication Data

US 2021/0366356 A1    Nov. 25, 2021

(30) Foreign Application Priority Data

May 21, 2020 (TW) ................. 109116817

(51) Int. Cl.
*G09G 3/20* (2006.01)
(52) U.S. Cl.
CPC ....... *G09G 3/2092* (2013.01); *G09G 2310/08* (2013.01); *G09G 2370/08* (2013.01)
(58) Field of Classification Search
CPC ............. G09G 3/2092; G09G 2310/08; G09G 2370/08
See application file for complete search history.

(56) References Cited

U.S. PATENT DOCUMENTS

| | | | |
|---|---|---|---|
| 2003/0152160 A1* | 8/2003 | Bauch .................. | G09G 5/006 375/295 |
| 2010/0097358 A1* | 4/2010 | Totoki .................. | G09G 3/20 345/204 |
| 2021/0090528 A1* | 3/2021 | Zheng .................. | G09G 5/397 |

* cited by examiner

*Primary Examiner* — Gustavo Polo
(74) *Attorney, Agent, or Firm* — WPAT, PC (57) ABSTRACT

The present disclosure discloses an image data transmission apparatus having synchronous data transmission mechanism. A primary image data transmission circuit transmits a primary aligning signal at a primary transmission time point and receives a secondary aligning signal at a primary reception time point, to calculate a primary time difference accordingly and generate a primary data transmission timing. A secondary image data transmission circuit transmits the secondary aligning signal at a secondary transmission time point and receives the primary aligning signal at a secondary reception time point, to calculate a secondary time difference and perform adjusting based on a timing adjusting amount to generate a secondary data transmission timing. The timing adjusting amount equalizes the primary and the secondary time differences. The primary and the secondary image data transmission circuits perform synchronous data transmission with an image data reception apparatus according to the primary and the secondary data transmission timings.

15 Claims, 5 Drawing Sheets

IMAGE DISPLAY SYSTEM AND IMAGE DATA TRANSMISSION APPARATUS AND METHOD THEREOF HAVING SYNCHRONOUS DATA TRANSMISSION MECHANISM

BACKGROUND OF THE INVENTION

1. Field of the Invention

The present disclosure relates to an image display system and an image data transmission apparatus and method thereof having synchronous data transmission mechanism.

2. Description of Related Art

Some consumer electronics products, e.g. smart TVs and smart phones, become popular since these products provide various types of entertainments. As a result, the performance requirement of these products becomes higher and higher. Take liquid crystal display (LCD) television as an example, a television with large display usually offers a better viewing experience. Therefore, size of televisions becomes larger and larger, e.g. from 50 inches to 70 inches.

In a large dimension television, multiple image data transmission chips are required to provide image data corresponding to different areas of the panel such that the panel displays the image accordingly. However, such a design requires synchronous data transmission from the image data transmission chips to the panel. As a result, an accurate synchronous data transmission mechanism between the image data transmission chips and the panel is necessary, to allow the panel to receive and display the correct image data from the image data transmission chips.

SUMMARY OF THE INVENTION

In consideration of the deficiencies of the prior art, an object of the present disclosure is to provide an image display system and an image data transmission apparatus and method thereof having synchronous data transmission mechanism.

The present disclosure discloses an image data transmission apparatus having synchronous data transmission mechanism that includes a primary image data transmission circuit and a secondary image data transmission circuit. The primary image data transmission circuit is configured for transmitting a primary aligning signal at a primary transmission time point and receiving a secondary aligning signal at a primary reception time point, calculating a primary time difference between the primary transmission time point and the primary reception time point and setting a primary timing of the primary aligning signal to be a primary data transmission timing. The secondary image data transmission circuit is electrically coupled to the primary image data transmission circuit, and is configured for transmitting the secondary aligning signal at a secondary transmission time point and receiving the primary aligning signal at a secondary reception time point, calculating a secondary time difference between the secondary transmission time point and the secondary reception time point and adjusting a secondary timing of the secondary aligning signal according to a timing adjusting amount to be a secondary data transmission timing, wherein the timing adjusting amount is configured to equalize the primary time difference and the secondary time difference. The primary image data transmission circuit and the secondary image data transmission circuit perform synchronous data transmission with an image data reception apparatus according to the primary data transmission timing and the secondary data transmission timing respectively, such that the image data reception apparatus displays the image accordingly.

The present disclosure also discloses an image display system that includes an image data reception apparatus and an image data transmission apparatus electrically coupled to the image data reception apparatus. The image data transmission apparatus includes a primary image data transmission circuit and a secondary image data transmission circuit. The primary image data transmission circuit is configured for transmitting a primary aligning signal at a primary transmission time point and receiving a secondary aligning signal at a primary reception time point, calculating a primary time difference between the primary transmission time point and the primary reception time point and setting a primary timing of the primary aligning signal to be a primary data transmission timing. The secondary image data transmission circuit is electrically coupled to the primary image data transmission circuit, and is configured for transmitting the secondary aligning signal at a secondary transmission time point and receiving the primary aligning signal at a secondary reception time point, calculating a secondary time difference between the secondary transmission time point and the secondary reception time point and adjusting a secondary timing of the secondary aligning signal according to a timing adjusting amount to be a secondary data transmission timing, wherein the timing adjusting amount is configured to equalize the primary time difference and the secondary time difference. The primary image data transmission circuit and the secondary image data transmission circuit perform synchronous data transmission with the image data reception apparatus according to the primary data transmission timing and the secondary data transmission timing respectively, such that the image data reception apparatus displays the image accordingly.

The present disclosure further discloses an image data transmission method having synchronous data transmission mechanism used in an image data transmission apparatus, and includes the steps outlined below. A primary aligning signal is transmitted at a primary transmission time point and a secondary aligning signal is received at a primary reception time point by a primary image data transmission circuit. A primary time difference between the primary transmission time point and the primary reception time point is calculated by the primary image data transmission circuit. A primary timing of the primary aligning signal is set to be a primary data transmission timing by the primary image data transmission circuit. The secondary aligning signal is transmitted at a secondary transmission time point and the primary aligning signal is received at a secondary reception time point by a secondary image data transmission circuit. A secondary time difference between the secondary transmission time point and the secondary reception time point is calculated by the secondary image data transmission circuit. A secondary timing of the secondary aligning signal is adjusted according to a timing adjusting amount to be a secondary data transmission timing by the secondary image data transmission circuit, wherein the timing adjusting amount is configured to equalize the primary time difference and the secondary time difference. Synchronous data transmission is performed by the primary image data transmission circuit and the secondary image data transmission circuit with an image data reception apparatus according to the primary data transmission timing and the secondary data transmission timing respectively, such that the image data reception apparatus displays the image accordingly.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide an image display system, an image data transmission apparatus and an image data transmission method thereof having synchronous data transmission mechanism that make use of the time difference of the signal transmission between the primary and the secondary image data transmission circuits to determine the timing difference therebetween. The timing of the secondary image data transmission circuit can thus be adjusted to align with the timing of the primary image data transmission circuit. A synchronous data transmission mechanism can be accomplished.

Figure 1:
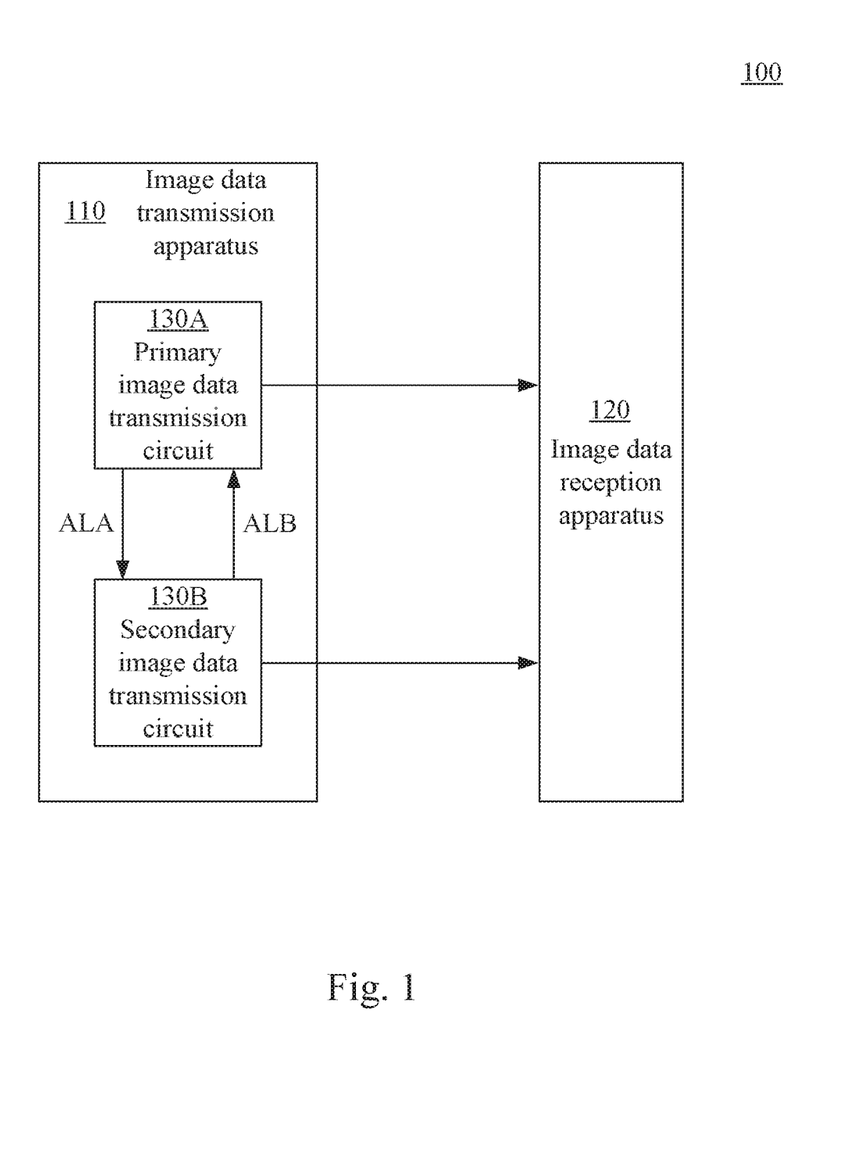
FIG. 1 illustrates a diagram of an image display system according to an embodiment of the present invention.

Reference is now made to FIG. 1. FIG. 1 illustrates a diagram of an image display system 100 having synchronous data transmission mechanism according to an embodiment of the present invention. The image display system 100 includes an image data transmission apparatus 110 and an image data reception apparatus 120.

In an embodiment, the image display system 100 can be, but not limited to, a television. The image data transmission apparatus 110 can be a circuit configured to provide image data, and the image data reception apparatus 120 can be a panel configured to receive and display the image data.

Under the trend that the size of the panel becomes larger, the image data transmission apparatus 110 can use different internal circuits and corresponding channels to transmit a plurality of pieces of image data (not illustrated) to the image data reception apparatus 120 to be displayed. Different pieces of image data correspond to different display areas of the panel and may be received by different internal circuits and corresponding channels of the image data reception apparatus 120. As a result, a synchronous data transmission mechanism is required at the image data transmission apparatus 110 end to ensure that the image data reception apparatus 120 can receive and display the plurality of pieces of image data according to accurate timings. In this way, the correct image frame can be displayed.

The synchronous data transmission mechanism of the image data transmission apparatus 110 is described in detail in the following paragraphs.

The image data transmission apparatus 110 includes a primary image data transmission circuit 130A and a secondary image data transmission circuit 130B. The primary image data transmission circuit 130A is configured to generate and transmit a primary aligning signal ALA to the secondary image data transmission circuit 130B. The secondary image data transmission circuit 130B is configured to generate and transmit a secondary aligning signal ALB to the primary image data transmission circuit 130A. It is appreciated that the terms "primary" and "secondary" described above are merely used to distinguish different circuits and the signals transmitted therefrom and thereto, and are not intended to identify the importance or priority of the circuits or signals.

Figure 2A:
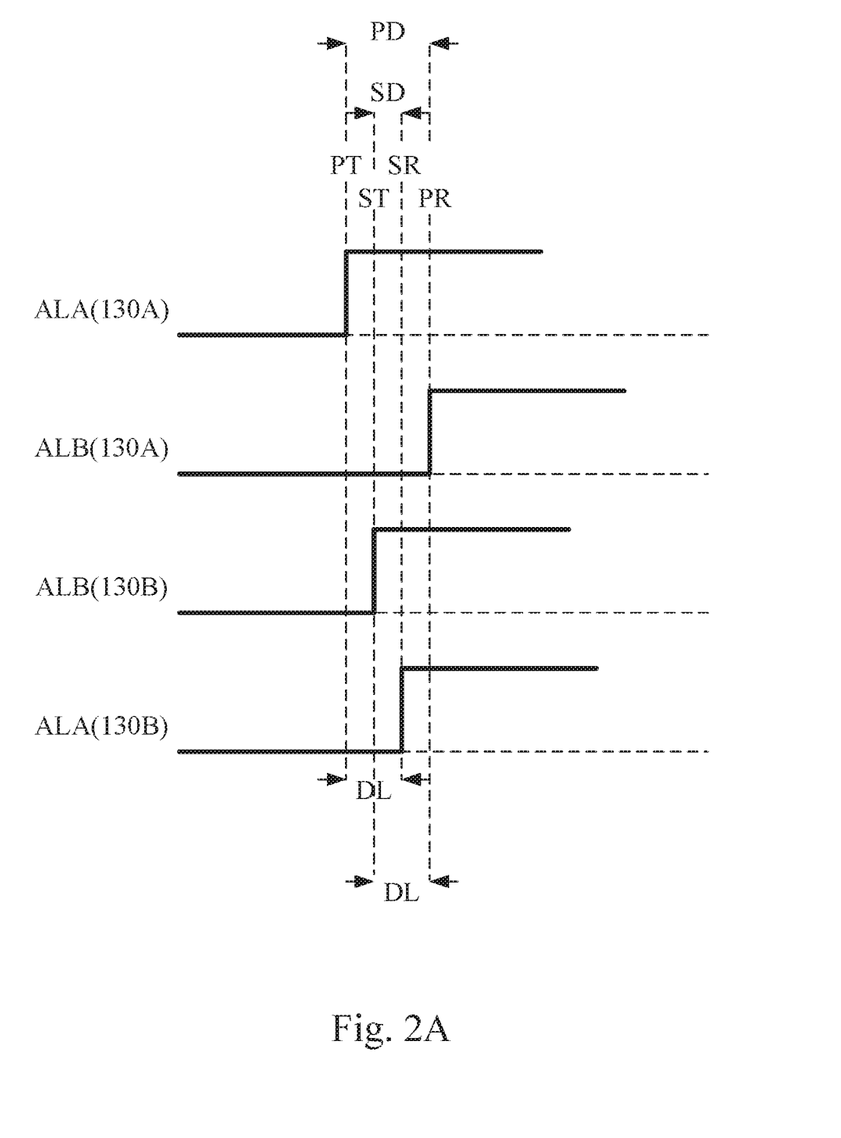
FIG. 2A illustrates a timing diagram of the transmission of the primary aligning signal and the secondary aligning signal between the primary image data transmission circuit and the secondary image data transmission circuit according to an embodiment of the present invention.

Reference is now made to FIG. 2A. FIG. 2A illustrates a timing diagram of the primary aligning signal ALA and the secondary aligning signal ALB being transmitted between the primary image data transmission circuit 130A and the secondary image data transmission circuit 130B according to an embodiment of the present invention.

In FIG. 2A, the primary aligning signal ALA and the secondary aligning signal ALB related to the primary image data transmission circuit 130A are labeled as 130A in brackets. The primary aligning signal ALA and the secondary aligning signal ALB related to the secondary image data transmission circuit 130B are labeled as 130B in brackets.

The primary image data transmission circuit 130A is configured to generate and transmit the primary aligning signal ALA at a primary transmission time point PT, and is configured to receive the secondary aligning signal ALB at a primary reception time point PR. As a result, the primary image data transmission circuit 130A can calculate a primary time difference PD between the primary transmission time point PT and the primary reception time point PR.

Similarly, the secondary image data transmission circuit 130B is configured to generate and transmit the secondary aligning signal ALB at a secondary transmission time point ST, and is configured to receive the primary aligning signal ALA at a secondary reception time point SR. As a result, the secondary image data transmission circuit 130B can calculate a secondary time difference SD between the secondary transmission time point ST and the secondary reception time point SR.

It is appreciated that, since the signal transmission path between the primary image data transmission circuit 130A and the secondary image data transmission circuit 130B may cause a delay, a delay time DL is presented between the primary transmission time point PT, which is the timing that the primary aligning signal ALA being transmitted by the primary image data transmission circuit 130A, and the secondary reception time point SR, which is the timing that the primary aligning signal ALA being received by the secondary image data transmission circuit 130B. In general, the delay time DL is determined by the distance of the signal transmission path. Similarly, the delay time DL is also presented between the secondary transmission time point ST, which is the timing that the secondary aligning signal ALB being transmitted by the secondary image data transmission circuit 130B, and the primary reception time point PR, which is the timing that the secondary aligning signal ALB being received by the primary image data transmission circuit 130A.

In the present embodiment, as illustrated in FIG. 2A, the time point that the primary image data transmission circuit 130A generates the primary aligning signal ALA (i.e. primary transmission time point PT) is ahead of the time point that the secondary image data transmission circuit 130B generates the secondary aligning signal ALB (i.e. secondary transmission time point ST).

Under such a condition, the primary time difference PD between the primary transmission time point PT and the primary reception time point PR is larger than the secondary time difference SD between the secondary transmission time point ST and secondary reception time point SR.

As a result, when the primary time difference PD is larger than the secondary time difference SD, the timing that the primary image data transmission circuit 130A generates the primary aligning signal ALA (which is called "primary timing" hereinafter) is determined to be ahead of the timing that the secondary image data transmission circuit 130B generates the secondary aligning signal ALB (which is called "secondary timing" hereinafter). As a result, the secondary timing corresponding to the secondary aligning signal ALB can be moved to an earlier time point according to a timing adjusting amount, in order to align the secondary timing with the primary timing corresponding to the primary aligning signal ALA. In an embodiment, the timing adjusting amount is the difference between the primary time difference PD and the delay time DL.

Figure 2B:
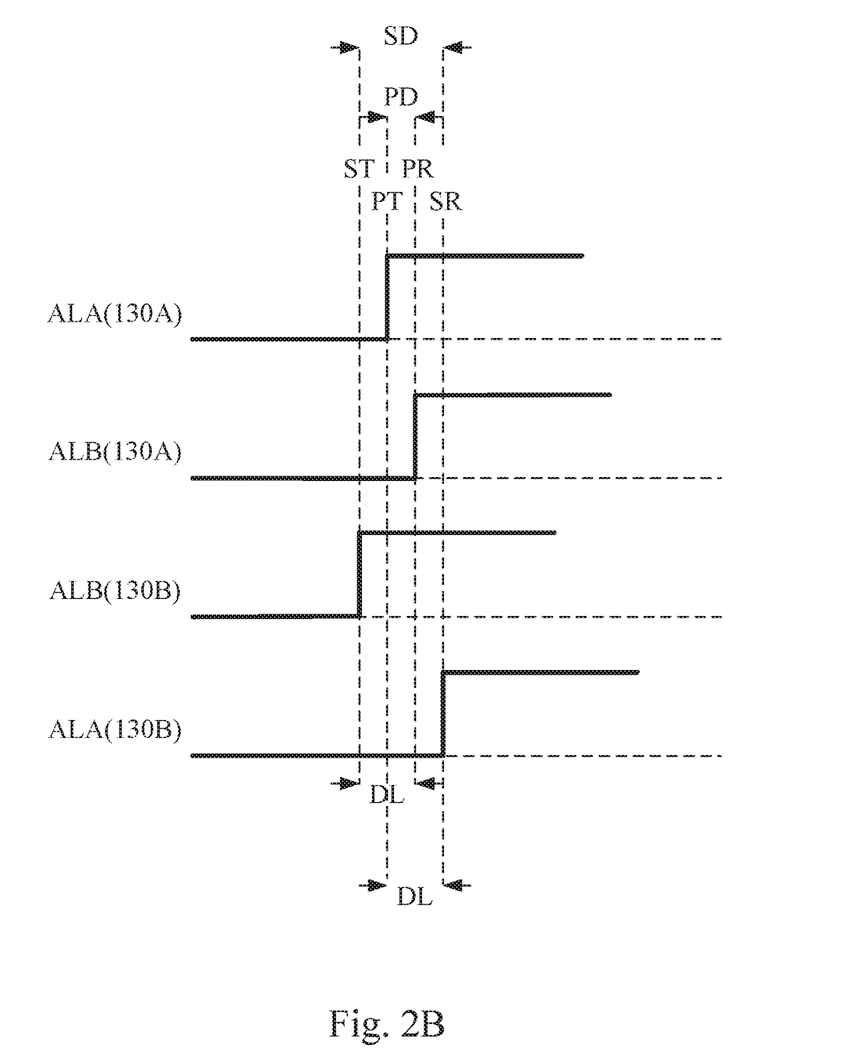
FIG. 2B illustrates a timing diagram of the transmission of the primary aligning signal and the secondary aligning signal between the primary image data transmission circuit and the secondary image data transmission circuit according to another embodiment of the present invention.

Reference is now made to FIG. 2B. FIG. 2B illustrates a timing diagram of the primary aligning signal ALA and the secondary aligning signal ALB being transmitted between the primary image data transmission circuit 130A and the secondary image data transmission circuit 130B according to another embodiment of the present invention.

The labels and the relation between the signals and the circuits in FIG. 2B are identical to those in FIG. 2A. As a result, the detail is not described herein. In the present embodiment, as illustrated in FIG. 2B, the timing that the primary image data transmission circuit 130A generates the primary aligning signal ALA (i.e. the primary transmission time point PT) is behind the time point that the secondary image data transmission circuit 130B generates the secondary aligning signal ALB (i.e. secondary transmission time point ST).

The signal transmission path has the same delay time DL. Under such a condition, the primary time difference PD between the primary transmission time point PT and the primary reception time point PR is smaller than the secondary time difference SD between the secondary transmission time point ST and the secondary reception time point SR.

As a result, when the primary time difference PD is smaller than the secondary time difference SD, the timing that the primary image data transmission circuit 130A generates the primary aligning signal ALA is determined to be behind the timing that the secondary image data transmission circuit 130B generates the secondary aligning signal ALB. As a result, the secondary timing corresponding to the secondary aligning signal ALB can be moved to a later time point according to a timing adjusting amount, in order to align the secondary timing with the primary timing corresponding to the primary aligning signal ALA. In an embodiment, the timing adjusting amount is the difference between the secondary time difference SD and the delay time DL.

Figure 2C:
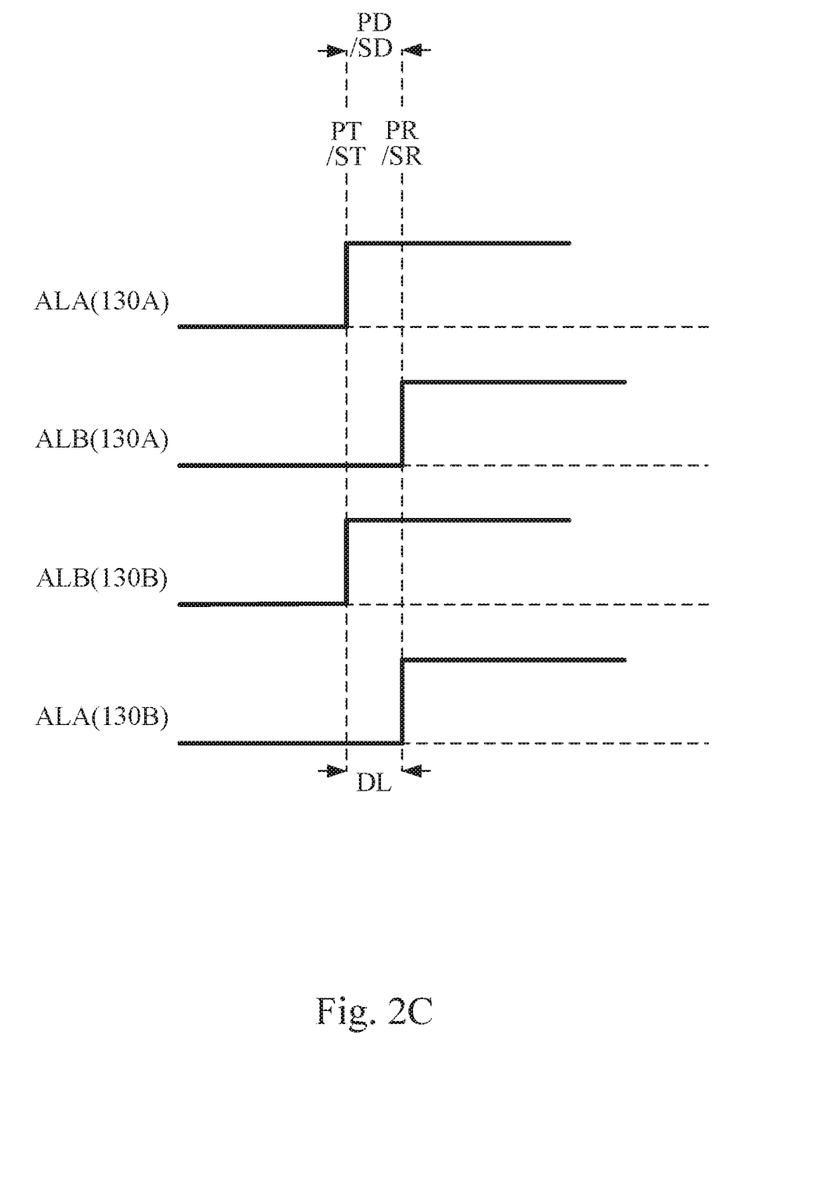
FIG. 2C illustrates a timing diagram of the transmission of the primary aligning signal and the secondary aligning signal between the primary image data transmission circuit and the secondary image data transmission circuit according to yet another embodiment of the present invention.

Reference is now made to FIG. 2C. FIG. 2C illustrates a timing diagram of the primary aligning signal ALA and the secondary aligning signal ALB being transmitted between the primary image data transmission circuit 130A and the secondary image data transmission circuit 130B according to yet another embodiment of the present invention.

The reference numbers and the relation between the signals and the circuits in FIG. 2C are identical to those in FIG. 2A. As a result, the detail is not described herein. In the present embodiment, as illustrated in FIG. 2C, the timing that the primary image data transmission circuit 130A generates the primary aligning signal ALA (i.e. the primary transmission time point PT) is identical to the time point that the secondary image data transmission circuit 130B generates the secondary aligning signal ALB (i.e. secondary transmission time point ST).

It is assumed that the two signal transmission paths have the same delay time DL. Under such a condition, the primary time difference PD between the primary transmission time point PT and the primary reception time point PR is equal to the secondary time difference SD between the secondary transmission time point ST and the secondary reception time point SR.

As a result, when the primary time difference PD is equal to the secondary time difference SD, the timing that the primary image data transmission circuit 130A generates the primary aligning signal ALA is determined to be identical to the timing that the secondary image data transmission circuit 130B generates the secondary aligning signal ALB. As a result, the secondary timing corresponding to the secondary aligning signal ALB can remain unchanged. More specifically, the timing adjusting amount keeps the secondary timing unchanged.

In an embodiment, the comparison process between the primary time difference PD and the secondary time difference SD and the calculation process of the timing adjusting amount are performed by the primary image data transmission circuit 130A.

More specifically, the primary image data transmission circuit 130A is configured to receive the secondary time difference SD from the secondary image data transmission circuit 130B, to calculate the timing adjusting amount according to the primary time difference PD and the secondary time difference SD, and to control the secondary image data transmission circuit 130B to adjust the secondary timing according to the timing adjusting amount.

In another embodiment, the comparison process between the primary time difference PD and the secondary time difference SD and the calculation process of the timing adjusting amount are performed by the secondary image data transmission circuit 130B.

More specifically, the secondary image data transmission circuit 130B is configured to receive the primary time difference PD from the primary image data transmission circuit 130A, to calculate the timing adjusting amount according to the primary time difference PD and the secondary time difference SD, and to adjust the secondary timing according to the timing adjusting amount.

Subsequently, the primary image data transmission circuit 130A sets the primary timing of the primary aligning signal ALA to be a primary data transmission timing. The secondary image data transmission circuit 130B moves the secondary timing of the secondary aligning signal ALB according to the timing adjusting amount to become a secondary data transmission timing.

In this manner, the primary image data transmission circuit 130A and the secondary image data transmission circuit 130B can perform synchronous data transmission with the image data reception apparatus 120 according to the primary data transmission timing and the secondary data transmission timing respectively, such that the image data reception apparatus 120 can display the image according to the two pieces of synchronous image data.

It is appreciated that only one secondary image data transmission circuit is used as an example in the above embodiment. In other embodiments, the image data transmission apparatus 110 may include a plurality of secondary image data transmission circuits, each being able to exchange signals for aligning with the primary image data transmission circuit. After the calculation of the primary and the secondary time differences according to the transmission time point and the reception time point of the signals, the timing can be adjusted according to the relation between the primary and the secondary time differences. When the number of the primary image data transmission circuit and the plurality of secondary image data transmission circuits is N, N pieces of image data can be transmitted synchronously with the primary image data transmission circuit. Furthermore, in the embodiment described above, the internal circuits of the image data reception apparatus 120 are not illustrated. In other embodiments, the image data reception apparatus 120 may include a plurality of image data reception circuits, each electrically coupled to one of the image data transmission circuits in the image data transmission apparatus 110 through an independent channel to perform synchronous image data transmission. In other words, the image data reception circuits in the image data reception apparatus 120 may use the same method to align the timings therebetween to perform synchronous image data reception.

As a result, the image data transmission apparatus of the present invention can determine the timing difference between the primary and the secondary image data transmission circuits according to the differences of the time points of the signal transmission therebetween. The timing of the secondary image data transmission circuit can be adjusted accordingly to align with the timing of the primary image data transmission circuit. The synchronous data transmission can be accomplished.

Figure 3:
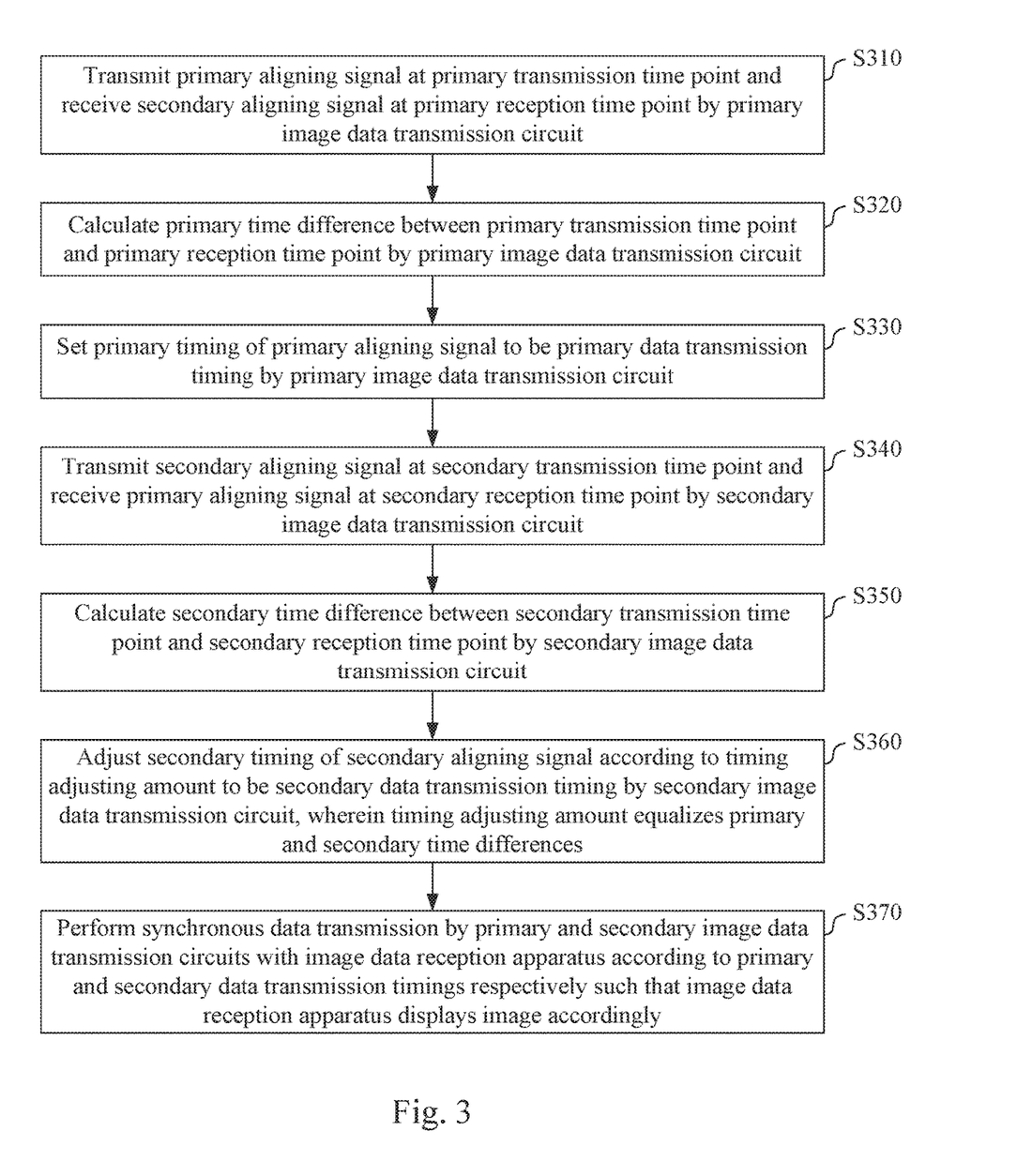
FIG. 3 illustrates a flow chart of an image data transmission method having synchronous data transmission mechanism according to an embodiment of the present invention.

Reference is now made to FIG. 3. FIG. 3 illustrates a flow chart of an image data transmission method 300 having synchronous data transmission mechanism according to an embodiment of the present invention.

Besides the apparatus described above, the present invention further discloses the image data transmission method 300 that can be used in such as, but not limited to the image data transmission apparatus 110 illustrated in FIG. 1. An embodiment of the image data transmission method 300 is illustrated in FIG. 3 and includes the steps outlined below.

In step S310, the primary aligning signal ALA is transmitted at the primary transmission time point PT and the secondary aligning signal ALB is received at the primary reception time point PR by the primary image data transmission circuit 130A.

In step S320, the primary time difference PD between the primary transmission time point PT and the primary reception time point PR is calculated by the primary image data transmission circuit 130A.

In step S330, the primary timing of the primary aligning signal ALA is set to be the primary data transmission timing by the primary image data transmission circuit 130A.

In step S340, the secondary aligning signal ALB is transmitted at the secondary transmission time point ST and the primary aligning signal ALA is received at the secondary reception time point SR by the secondary image data transmission circuit 130B.

In step S350, the secondary time difference SD between the secondary transmission time point ST and the secondary reception time point SR is calculated by the secondary image data transmission circuit 130B.

In step S360, the secondary timing of the secondary aligning signal ALB is adjusted according to the timing adjusting amount to be the secondary data transmission timing by the secondary image data transmission circuit 130B, wherein the timing adjusting amount is configured to equalize the primary time difference PD and the secondary time difference SD.

In step S370, synchronous data transmission is performed by the primary image data transmission circuit 130A and the secondary image data transmission circuit 130B with the image data reception apparatus 120 according to the primary data transmission timing and the secondary data transmission timing respectively, such that the image data reception apparatus 120 displays the image accordingly.

It is appreciated that the embodiments described above are merely an example. In other embodiments, it should be appreciated that many modifications and changes may be made by those of ordinary skill in the art without departing from the spirit of the invention.

In summary, the image display system and the image data transmission apparatus and method thereof having synchronous data transmission mechanism of the present invention can determine the timing difference between the primary and the secondary image data transmission circuits according to the differences of the time points of the signal transmission therebetween. The timing of the secondary image data transmission circuit can be adjusted accordingly to align with the timing of the primary image data transmission circuit. The synchronous data transmission can be accomplished.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. An image data transmission apparatus having synchronous data transmission mechanism comprising:
 a primary image data transmission circuit configured for:
  transmitting a primary aligning signal at a primary transmission time point and receiving a secondary aligning signal at a primary reception time point;
  calculating a primary time difference between the primary transmission time point and the primary reception time point; and
  setting a primary timing of the primary aligning signal to be a primary data transmission timing; and
 a secondary image data transmission circuit coupled to the primary image data transmission circuit, and configured for:
  transmitting the secondary aligning signal at a secondary transmission time point and receiving the primary aligning signal at a secondary reception time point;
  calculating a secondary time difference between the secondary transmission time point and the secondary reception time point; and
  adjusting a secondary timing of the secondary aligning signal according to a timing adjusting amount to be a secondary data transmission timing, wherein the timing adjusting amount is configured to equalize the primary time difference and the secondary time difference;

wherein the primary image data transmission circuit and the secondary image data transmission circuit perform synchronous data transmission with an image data reception apparatus according to the primary data transmission timing and the secondary data transmission timing respectively, such that the image data reception apparatus displays the image accordingly.

2. The image data transmission apparatus of claim 1, wherein when the primary time difference is larger than the secondary time difference, the timing adjusting amount moves the secondary timing to an earlier time point as the secondary data transmission timing;

when the primary time difference is smaller than the secondary time difference, the timing adjusting amount moves the secondary timing to a later time point as the secondary data transmission timing; and when the primary time difference is equal to the secondary time difference, the timing adjusting amount keeps the secondary timing unchanged as the secondary data transmission timing.

3. The image data transmission apparatus of claim 1, wherein the image data transmission comprises a plurality of the secondary image data transmission circuits.

4. The image data transmission apparatus of claim 1, wherein the primary image data transmission circuit is further configured to receive the secondary time difference from the secondary image data transmission circuit, to calculate the timing adjusting amount according to the primary time difference and the secondary time difference, and to control the secondary image data transmission circuit to adjust the secondary timing according to the timing adjusting amount.

5. The image data transmission apparatus of claim 1, wherein the secondary image data transmission circuit is further configured to receive the primary time difference from the primary image data transmission circuit, to calculate the timing adjusting amount according to the primary time difference and the secondary time difference, and to adjust the secondary timing according to the timing adjusting amount.

6. An image display system comprising:
an image data reception apparatus; and
an image data transmission apparatus coupled to the image data reception apparatus, and comprising:
a primary image data transmission circuit configured for:
transmitting a primary aligning signal at a primary transmission time point and receiving a secondary aligning signal at a primary reception time point;
calculating a primary time difference between the primary transmission time point and the primary reception time point; and
setting a primary timing of the primary aligning signal to be a primary data transmission timing; and
a secondary image data transmission circuit coupled to the primary image data transmission circuit, and configured for:
transmitting the secondary aligning signal at a secondary transmission time point and receiving the primary aligning signal at a secondary reception time point;
calculating a secondary time difference between the secondary transmission time point and the secondary reception time point; and
adjusting a secondary timing of the secondary aligning signal according to a timing adjusting amount to be a secondary data transmission timing, wherein the timing adjusting amount is configured to equalize the primary time difference and the secondary time difference;

wherein the primary image data transmission circuit and the secondary image data transmission circuit perform synchronous data transmission with the image data reception apparatus according to the primary data transmission timing and the secondary data transmission timing respectively, such that the image data reception apparatus displays the image accordingly.

7. The image display system of claim 6, wherein when the primary time difference is larger than the secondary time difference, the timing adjusting amount moves the secondary timing to an earlier time point as the secondary data transmission timing;

when the primary time difference is smaller than the secondary time difference, the timing adjusting amount moves the secondary timing to a later time point as the secondary data transmission timing; and when the primary time difference is equal to the secondary time difference, the timing adjusting amount keeps the secondary timing unchanged as the secondary data transmission timing.

8. The image display system of claim 6, wherein the image data transmission comprises a plurality of the secondary image data transmission circuits.

9. The image display system of claim 6, wherein the primary image data transmission circuit is further configured to receive the secondary time difference from the secondary image data transmission circuit, to calculate the timing adjusting amount according to the primary time difference and the secondary time difference, and to control the secondary image data transmission circuit to adjust the secondary timing according to the timing adjusting amount.

10. The image display system of claim 6, wherein the secondary image data transmission circuit is further configured to receive the primary time difference from the primary image data transmission circuit, to calculate the timing adjusting amount according to the primary time difference and the secondary time difference, and to adjust the secondary timing according to the timing adjusting amount.

11. An image data transmission method having synchronous data transmission mechanism used in an image data transmission apparatus, and comprising:
transmitting a primary aligning signal at a primary transmission time point and receiving a secondary aligning signal at a primary reception time point by a primary image data transmission circuit;
calculating a primary time difference between the primary transmission time point and the primary reception time point by the primary image data transmission circuit;
setting a primary timing of the primary aligning signal to be a primary data transmission timing by the primary image data transmission circuit;
transmitting the secondary aligning signal at a secondary transmission time point and receiving the primary aligning signal at a secondary reception time point by a secondary image data transmission circuit;

calculating a secondary time difference between the secondary transmission time point and the secondary reception time point by the secondary image data transmission circuit;

adjusting a secondary timing of the secondary aligning signal according to a timing adjusting amount to be a secondary data transmission timing by the secondary image data transmission circuit, wherein the timing adjusting amount is configured to equalize the primary time difference and the secondary time difference; and performing synchronous data transmission by the primary image data transmission circuit and the secondary image data transmission circuit with an image data reception apparatus according to the primary data transmission timing and the secondary data transmission timing respectively, such that the image data reception apparatus displays the image accordingly.

12. The image data transmission method of claim 11, wherein when the primary time difference is larger than the secondary time difference, the timing adjusting amount moves the secondary timing to an earlier time point as the secondary data transmission timing;

when the primary time difference is smaller than the secondary time difference, the timing adjusting amount moves the secondary timing to a later time point as the secondary data transmission timing; and when the primary time difference is equal to the secondary time difference, the timing adjusting amount keeps the secondary timing unchanged as the secondary data transmission timing.

13. The image data transmission method of claim 11, wherein the image data transmission comprises a plurality of the secondary image data transmission circuits.

14. The image data transmission method of claim 11, further comprising:

receiving the secondary time difference, by the primary image data transmission circuit, from the secondary image data transmission circuit; and calculating the timing adjusting amount, by the primary image data transmission circuit, according to the primary time difference and the secondary time difference, in order to control the secondary image data transmission circuit to adjust the secondary timing according to the timing adjusting amount.

15. The image data transmission method of claim 11, further comprising:

receiving the primary time difference, by the secondary image data transmission circuit, from the primary image data transmission circuit; and calculating the timing adjusting amount, by the secondary image data transmission circuit, according to the primary time difference and the secondary time difference, and to adjust the secondary timing according to the timing adjusting amount.

* * * * *